United States Patent
Gorenzweig et al.

(10) Patent No.: US 9,656,523 B2
(45) Date of Patent: May 23, 2017

(54) TIRE PRESSURE CONTROL SYSTEM FOR A VEHICLE

(71) Applicants: Igor Gorenzweig, Wuppertal (DE); Stefan Moenig, Schwelm (DE); Yevgen Dementyev, Wuppertal (DE); Sven Arnoldo, Malsch (DE); Axel Dussinger, Bad Rappenau (DE); Benedikt Gamer, Bretten (DE)

(72) Inventors: Igor Gorenzweig, Wuppertal (DE); Stefan Moenig, Schwelm (DE); Yevgen Dementyev, Wuppertal (DE); Sven Arnoldo, Malsch (DE); Axel Dussinger, Bad Rappenau (DE); Benedikt Gamer, Bretten (DE)

(73) Assignee: Huf Huelsbeck & Fuerst GmbH & Co. KG, Velbert (DE)

(*) Notice: Subject to any disclaimer, the term of this patent is extended or adjusted under 35 U.S.C. 154(b) by 0 days.

(21) Appl. No.: 14/855,970

(22) Filed: Sep. 16, 2015

(65) Prior Publication Data

US 2016/0082792 A1 Mar. 24, 2016

(30) Foreign Application Priority Data

Sep. 19, 2014 (DE) .................. 10 2014 113 573

(51) Int. Cl.
*B60C 23/04* (2006.01)
(52) U.S. Cl.
CPC ...... *B60C 23/0491* (2013.01); *B60C 23/0408* (2013.01); *B60C 23/0494* (2013.01)

(58) Field of Classification Search
None
See application file for complete search history.

(56) References Cited

U.S. PATENT DOCUMENTS

| | | | |
|---|---|---|---|
| 8,490,480 B2 | 7/2013 | Tadele et al. | |
| 2005/0087007 A1 | 4/2005 | Uleski | |
| 2006/0125612 A1* | 6/2006 | Okubo | B60C 23/0408 340/445 |
| 2006/0130570 A1* | 6/2006 | Anders | B60C 23/0488 73/146 |
| 2009/0223570 A1* | 9/2009 | Yu | B60C 23/0494 137/223 |
| 2010/0024539 A1* | 2/2010 | Hamm | B60C 23/0408 73/146.5 |
| 2010/0064792 A1* | 3/2010 | Chuang | B60C 23/0494 73/146.8 |

(Continued)

FOREIGN PATENT DOCUMENTS

| | | |
|---|---|---|
| DE | 10 2004 048 244 A1 | 6/2005 |
| DE | 20 2009 007 703 U1 | 4/2010 |
| DE | 10 2010 050 365 A1 | 5/2012 |

*Primary Examiner* — Andre Allen
(74) *Attorney, Agent, or Firm* — Fay Sharpe LLP

(57) ABSTRACT

A tire pressure control system for a vehicle for determining tire-specific parameters, includes a valve body with a mounting portion, at least one mounting element and a tire pressure sensor with a housing, which has a mounting area. The mounting portion is detachably engaged via a mounting element with the mounting area of the housing. The tire pressure control system can be mounted in an easy, compact, cost-effective and simple way in that the mounting element is integrally formed with the housing of the tire pressure sensor.

17 Claims, 5 Drawing Sheets

(56) References Cited

U.S. PATENT DOCUMENTS

| | | | |
|---|---|---|---|
| 2011/0248204 A1 | 10/2011 | Palaoro et al. | |
| 2012/0017672 A1* | 1/2012 | Uh | B60C 23/0494 73/146.8 |
| 2013/0333459 A1* | 12/2013 | Yu | B60C 23/0494 73/146.8 |
| 2015/0068297 A1* | 3/2015 | Duffy | B60C 23/04 73/146.8 |
| 2015/0210126 A1* | 7/2015 | Arnoldo | B60C 23/0498 73/146.5 |
| 2015/0217606 A1* | 8/2015 | Peng | B60C 23/0455 73/146.8 |
| 2016/0016445 A1* | 1/2016 | Peine | B60C 23/0494 73/146.5 |
| 2016/0167463 A1* | 6/2016 | Gout | B60C 23/0498 73/146.3 |

\* cited by examiner

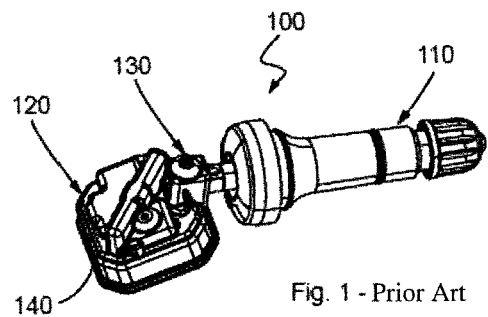
Fig. 1 - Prior Art
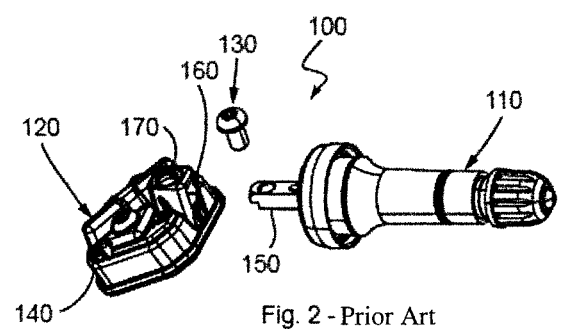
Fig. 2 - Prior Art
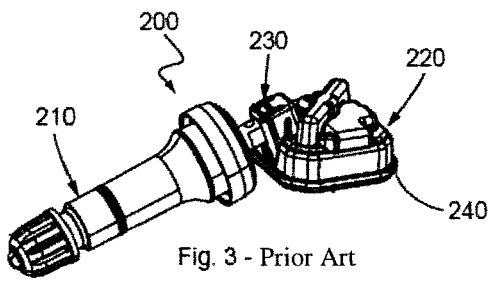
Fig. 3 - Prior Art
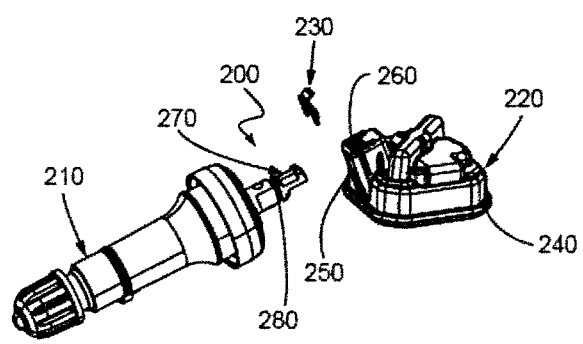
Fig. 4 - Prior Art

TIRE PRESSURE CONTROL SYSTEM FOR A VEHICLE

BACKGROUND

The invention relates to a tire pressure control system for a vehicle for determining tire-specific parameters, which comprises a valve body, at least one mounting element and a tire pressure sensor with a housing, which houses means for determining at least one tire-specific parameter and means for wireless transmission of the at least one tire-specific parameter to an on-board control device, wherein the housing has a mounting area and the valve body comprises a mounting portion, and wherein the mounting portion of the valve body is detachably engaged by means of a mounting element with the mounting area of the housing.

Vehicle safety and reliability are central aspects of automotive technology. Therefore, for safety-related reasons alone, the tire pressure of motor vehicles should be regularly monitored which, however, is often neglected by the driver. For this reason, an increasing number of modern vehicles are equipped with detecting means in the form of tire pressure sensors, which measure the pressure in the tires automatically and transmit it to an on-board control device. In this way, accidents or defects resulting from low tire pressure should be avoided. Such automatic measuring of the tire pressure makes it possible to detect early and indicate to the driver when the tire pressure critically deviates from a tire pressure nominal value, thus making a manual inspection unnecessary. In such systems for automatic measuring of the tire pressure, one tire pressure sensor is arranged, respectively, on each tire or pneumatic tire. At the same time, a tire pressure sensor often comprises at least one sensor for detecting the tire pressure or the temperature, as well as one transmission unit and, if required, one electronic evaluation unit, which can also be on-board.

FIGS. 1 and 2 show a tire pressure control system 100 of the type mentioned at the outset, which is known, for example, from DE 10 2010 050 365 A1. This well-known system 100 comprises a valve body 110, a tire pressure sensor 120 and a mounting element 130, which fixes the valve body 110 to the tire pressure sensor 120, wherein the mounting element 130 is designed in the form of a screw. For mounting the valve body 110 to the tire pressure sensor 120, the valve body 110 with its mounting portion 150 is inserted in a receptacle 160 provided at the housing 140 of the tire pressure sensor 120. The receptacle 160 has a drill hole 170, which extends transverse to the direction in which the valve body 110 is inserted and into which the mounting element 130 designed in the form of a screw is screwed in order to attach the valve body 110 to the housing 140. This well-known tire pressure control system 100 has the disadvantage that the mounting process involves the danger that the mounting element 130 designed in the form of a screw is lost and that a mounting aid in the form of a screw driver is required to produce a screw connection, which would ultimately retain the valve body 110 on the housing 140 of the tire pressure sensor 120.

FIGS. 3 and 4 show a different tire pressure control system 200. The tire pressure control system 200 corresponds also with the type mentioned at the outset and is known, for example, from DE 10 2004 048 244 A1. This well-known system 200 also has a valve body 210, a tire pressure sensor 220 and a mounting element 230, which fixes the valve body 210 to the tire pressure sensor 220. However, in this tire pressure control system 200 the mounting element 230 is designed in the form of a spring clip. Nevertheless, also in this case, the valve body 210 is inserted in a receptacle 250 provided at the housing 240 of the tire pressure sensor 220 in order to attach the valve body 210 to the tire pressure sensor 220. The receptacle 250 has an insertion slot 260, which extends transverse to the direction of inserting the valve body 210 and into which the mounting element 230 designed in the form of a spring clip is inserted in order to engage in a recess 280 provided in the circumferential surface of the mounting portion 270 of the valve body 210, thus attaching the valve body 210 to the housing 240. This well-known tire pressure control system 200 also involves the danger that a separate mounting element 230 is provided for the mounting process, which complicates the process of mounting the valve body 210 to the housing 240.

BRIEF SUMMARY

The invention is based on the objective of finding a solution for providing in a constructionally simple manner a tire pressure control system, which can be mounted in an easy, compact, cost-effective and simple way.

In a tire pressure control system of the type mentioned at the outset, based on the invention, this objective is achieved in that the mounting element is formed integrally with the housing of the tire pressure sensor.

Advantageous and practical embodiments and further developments of the invention can be derived from the sub-claims.

The invention provides a tire pressure control system for a vehicle for determining tire-specific parameters, which is characterized by a functional design and an easy and cost-effective structure. Because of the fact that the mounting element is formed integrally with the housing of the tire pressure sensor, the valve body and tire pressure sensor can be assembled and removed without using any tools. In addition to a tool-free assembly and removal of the valve body and tire pressure sensor, the number of components of the tire pressure sensor is also reduced, resulting advantageously in a reduction of production costs. In the present invention, the term "formed integrally" is used as a synonym for the term "constructed in one piece". At the same time, the invention-based term "formed integrally" does not necessarily mean that the mounting element is produced together with the housing in such a way that these components are manufactured from a single and integral part or material. However, for the present invention, it is certainly also possible to interpret the term "formed integrally" in this way. In addition, the invention-based term "formed integrally" refers to embodiments in which the mounting element and the housing of the tire pressure sensor are not only firmly attached to one another, but are attached in such a way that they do not resemble several components joined together and shall be destroyed when they are separated.

A concrete implementation of the invention-based tool-free assembly provides that the mounting portion of the valve body has a ramp-like oblique surface, which is integrally molded on the circumferential surface of the valve body. When mounting the valve body to the tire pressure sensor, the flexibly mounted mounting element can be moved over the ramp-like oblique surface in order to engage the mounting portion of the valve body with the mounting element of the housing. For example, the mounting element can be designed in the form of a snap-fit, which is moved during the mounting process by the oblique surface and, after passing the oblique surface, engages in a recess in the valve body in order to attach the valve body to the housing.

Accordingly, provision is made by the invention that the mounting element has at least one snap-in hook, which extends in longitudinal direction when the valve body is mounted. When mounted, the at least one snap-in hook is engaged with an area specifically designed for this purpose on the valve body.

A further embodiment of the invention-based tire pressure control system provides that the at least one snap-in hook of the mounting element engages in a recess designed at the connecting section of the valve body when the valve body has been attached to the tire pressure sensor. The recess can be designed on portions or the entire circumference of the connecting section.

According to the invention, provision has been made as an alternative to the recess that, after mounting the valve body to the tire pressure sensor, the at least one snap-in hook of the mounting element engages to an adapter integrally molded to the connecting section of the valve body.

It is important for both embodiments that the connecting section of the valve body is designed in such a way that the snap-in hook of the housing can be engaged with the especially designed area of the mounting portion in order to attach the valve body at the housing of the tire pressure sensor.

For example, for the at least one snap-in hook to interact with the mounting portion designed in the form of a ramp-like oblique surface, the invention provides that the at least one snap-in hook is retained at the connecting section and can be moved in relation to the housing via at least one resiliently malleable support arm. In this way, at least one tool-free assembly of the valve body to the tire pressure sensor is possible.

With regard to a possible tool-free assembly (and removal), the invention provides in a further embodiment that the at least one support arm extends transverse to the longitudinal direction of the mounted valve body, wherein the at least one support arm is designed in the form of a torsion bar. By means of said torsion bar, the at least one snap-in hook can be disengaged from the mounting portion of the valve body by being swiveled about the at least one support arm.

In an alternative embodiment it is therefore of advantage that the at least one support arm extends parallel in longitudinal direction of the mounted valve body, wherein the at least one support arm is mounted at the housing on its longitudinal end facing away from the snap-in hook and is designed in the form of a spring arm. In a swivel movement pointing away from the longitudinal direction of the valve body the spring arm disengages the at least one snap-in hook from the valve body.

In a concrete embodiment of the alternative, the invention provides that the at least one snap-in hook is designed in the form of a U-shaped clamp that can be swiveled in a flexible manner. When the valve body has been mounted to the tire pressure sensor, said snap-in hook is overlapping a mounting lug, which is integrally molded to the mounting portion of the valve body.

For another alternative embodiment of a mounting element formed integrally with the housing, the invention provides that the mounting element has a cover-shaped clamp cap, which is connected with the housing via a film hinge, wherein the mounting area of the housing is designed in the form of a box and after the valve body has been mounted to the tire pressure sensor the clamp cap is releasably attached at the box-shaped mounting area. At the same time, the clamp cap is engaged with the mounting portion of the valve body.

For a tool-free assembly of the mounting element of this alternative embodiment, the invention provides that the box-shaped mounting area of the housing has at least one clamping bar, which extends in longitudinal direction transverse to the mounted valve body, and at least one clamping recess is designed in the clamp cap in complementary fashion to the at least one clamping bar. Via a clamp connection which, after mounting the clamp cap to the mounting area, is formed at the mounting area by the clamping bar clamped in the at least one clamping recess, the clamp cap is attached to the housing in such a way that the mounting portion of the valve body is locked.

For fixing the valve body to the alternative mounting element, it is further provided that a clamping lug which, when the valve body has been mounted, extends from the clamp cap transverse to the longitudinal direction of the valve body, engages behind a projection, which is integrally molded to the mounting portion of the valve body, in such a way that it blocks a movement of the valve body in its longitudinal direction away from the housing.

Finally, a further embodiment of the invention-based tire pressure control system provides that the mounting portion of the valve body has a bevel at least in sections, and the mounting area of the housing has a receptacle designed in complementary fashion to the bevel. As a result, when mounting the valve body to the tire pressure sensor, the mounting portion of the valve body can be inserted in a torsion-proof manner in the receptacle.

The characteristics mentioned above and those subsequently described can be used not only in the respective combinations described above but also in different combinations or by themselves without abandoning the scope of the present invention. The scope of the present invention is defined only by the claims.

BRIEF DESCRIPTION OF THE DRAWINGS

Further details, characteristics and advantages of the subject matter of the invention are included in the subsequent description in connection with the drawing, which shows examples of preferential embodiments of the invention. The drawing shows:

FIG. 1 a perspective view of a tire pressure control system known from prior art, FIG. 2 a perspective view of single components of the well-known tire pressure control system shown in FIG. 1, FIG. 3 a perspective view of a further tire pressure control system known from prior art, FIG. 4 a perspective view of single components of the well-known tire pressure control system shown in FIG. 3, FIG. 5 a perspective view of a tire pressure control system according to a first embodiment of the present invention, FIG. 6 a perspective view of a housing of a tire pressure sensor according to the first embodiment of the tire pressure control system shown in FIG. 5, FIG. 7 a perspective view of an enlarged view of a mounting area of the tire pressure sensor shown in FIG. 6, FIG. 8 a lateral sectional view of a mounting element of the tire pressure sensor, FIG. 9 an enlarged view of a valve body of the tire pressure control system shown in FIG. 5 according to a first embodiment, FIG. 10 a lateral sectional view of the mounting element engaged with the valve body shown in FIG. 9, FIG. 11 a lateral sectional view of the mounting element, which is no longer engaged with the valve body shown in FIG. 9, FIG. 12 an enlarged view of a valve body of the tire pressure control system shown in FIG. 5 according to a second embodiment, FIG. 13 a lateral sectional view of the mounting element engaged with the valve body shown in FIG. 12, FIG. 14 a lateral sectional view of the mounting element, which is no longer engaged with the valve body shown in FIG. 12, FIG. 15 a perspective view of a tire pressure control system according to a second embodiment of the present invention, FIG. 16 a perspective view of a housing of a tire pressure sensor according to the second embodiment of the tire pressure control system shown in FIG. 15, FIG. 17 a perspective view of an enlarged view of a valve body according to the second embodiment of the tire pressure control system shown in FIG. 15, FIG. 18 a lateral sectional view of a mounting element according to the second embodiment of the tire pressure control system shown in FIG. 15 engaged with the valve body shown in FIG. 16, FIG. 19 a lateral sectional view of the mounting element shown in FIG. 18, which is no longer engaged with the valve body shown in FIG. 17, FIG. 20 a perspective view of single components of a tire pressure control system according to a third embodiment of the present invention, FIG. 21 the tire pressure control system shown in FIG. 20 with the valve body mounted to the tire pressure sensor, FIG. 22 an enlarged sectional view of the mounting element of the tire pressure control system according to the third embodiment of the present invention, FIG. 23 an enlarged sectional view of a mounting area of a housing of a tire pressure sensor according to the third embodiment of the present invention, and FIG. 24 the third embodiment of the present invention after the valve body has been mounted at the housing.

DETAILED DESCRIPTION

Figure 5:
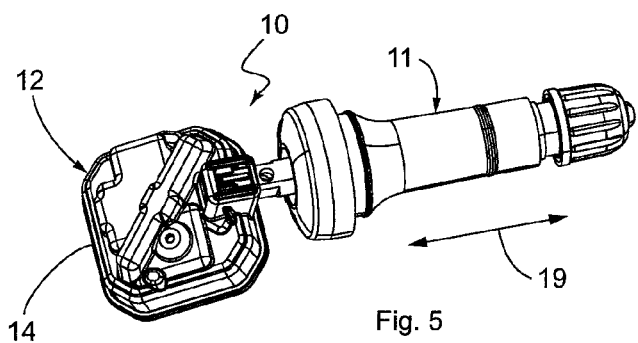
Figure 6:
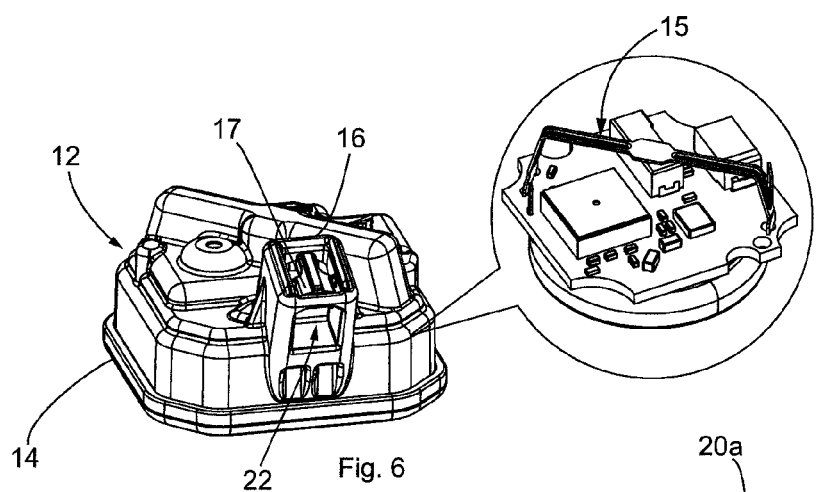

FIGS. 5 to 14 show a tire pressure control system 10 according to a first embodiment of the invention. It is a well-known fact that the tire pressure control system 10 can be used with a vehicle and that it is used for determining tire-specific parameters, for example, the air pressure and temperature. The tire pressure control system 10 shown in FIG. 5 comprises a valve body 11 and a tire pressure sensor 12. The tire pressure sensor 12 has a housing 14, which is shown in detail in FIG. 6 and which is placed in or at the means 15 (for example, in FIG. 6 a sensor 15) for determining at least one tire-specific parameter and for wireless transmission of the at least one tire-specific parameter to an on-board control device. The housing 14 has a mounting area 16, which sticks out in chimney-like manner from the housing 14 and is used for securing the valve body 11.

Figure 7:
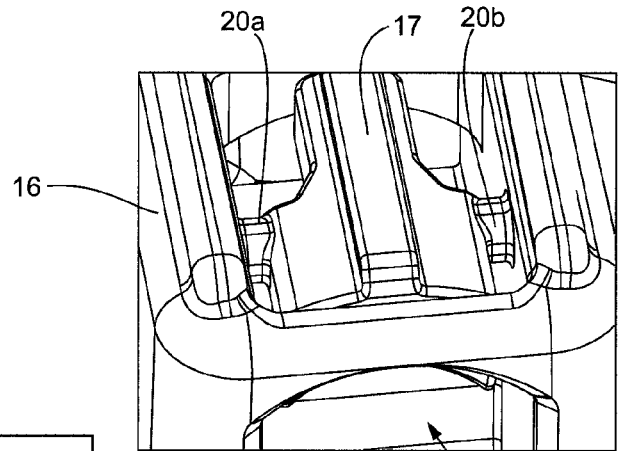
Figure 8:
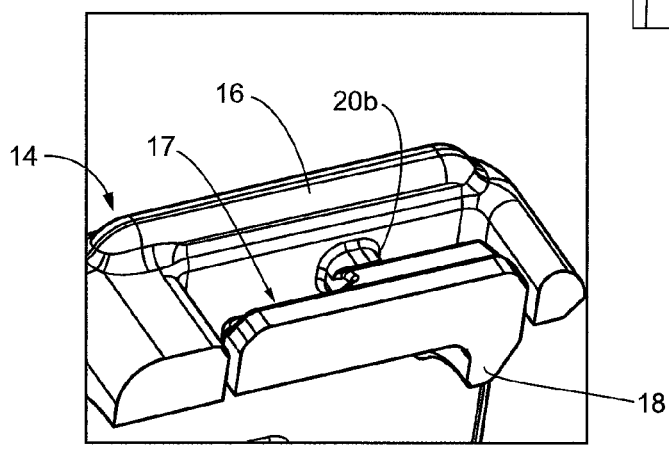

The mounting area 16 comprises a mounting element 17, which is described in more detail in FIGS. 7 and 8. According to the invention, the mounting element 17 is formed integrally with the housing 14 of the tire pressure sensor 12 and has a snap-in hook 18. When the valve body 11 has been mounted, the snap-in hook 18 extends in longitudinal direction 19 of the valve body 11 (for example, see FIG. 5). The snap-in hook 18 is retained at the mounting area 16 of the housing 14 via two lateral support arms 20a, 20b, which are resiliently malleable, and can be moved in relation to the housing 14. In an alternative variation, it is also possible to provide only one support arm for retaining the snap-in hook.

The support arms 20a, 20b extend transverse to the snap-in hook 18 and transverse to the longitudinal direction 19 of the mounted valve body 11 and allow for the snap-in hook 18 to swivel about the rotational axis 21 of the two support arms 20a, 20b. Both support arms 20a, 20b are designed in the form of a torsion bar or torsion spring and function accordingly. When rotating the snap-in hook 18 about the rotational axis 21, the two support arms 20a, 20b are twisted, i.e., a deflection of the support arms 20a, 20b does not take place.

The mounting area 16 of the housing 14 has a receptacle 22 (see FIG. 6), which is arranged below the mounting element 17 and which is used to receive a mounting portion 23 that can be inserted in the receptacle 22 of the valve body 11 (for example, see FIGS. 9 and 12). To adjust an opening 24 of the valve body 11, by means of which the tire of the vehicle can be supplied with air, the mounting portion 23 of the valve body 11 has a bevel 25 (for example, see FIGS. 9 and 12), wherein the receptacle 22 is designed in complementary manner to the mounting portion 23 with a bevel 25. For assembling the valve body 11 at the housing 14 of the tire pressure sensor 12, the mounting portion 23 of the valve body 11 can be and is inserted in torsion-proof manner in the receptacle 22.

The insertion of the mounting portion 23 of the valve body 11 into the receptacle 22 of the housing 14 results in the fact that the mounting element 17 engages with the mounting portion 23, which shall be subsequently described in more detail with reference to FIGS. 9 to 14.

Figure 11:
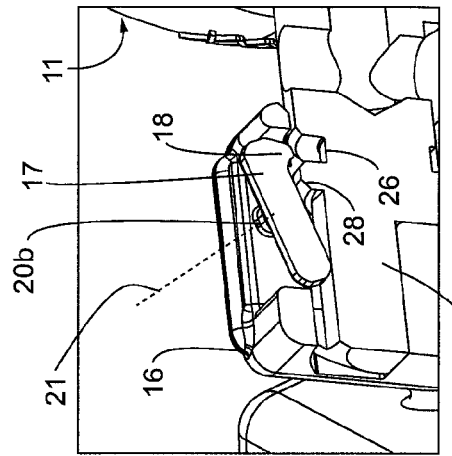
Figure 14:
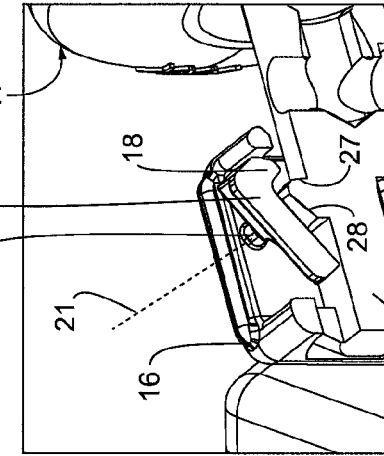
Figure 10:
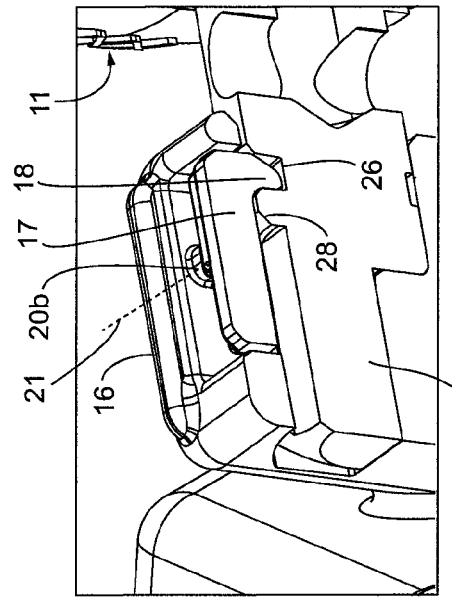
Figure 13:
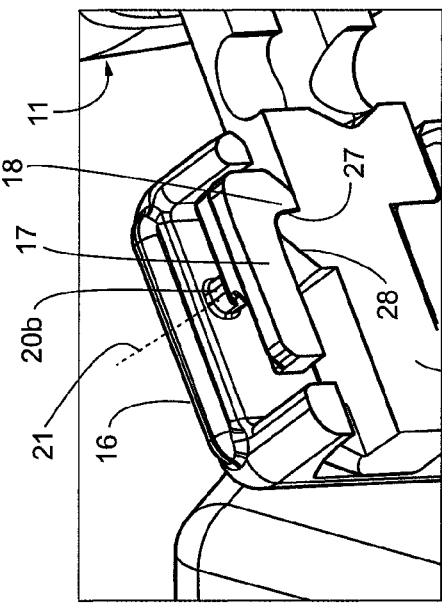
Figure 9:
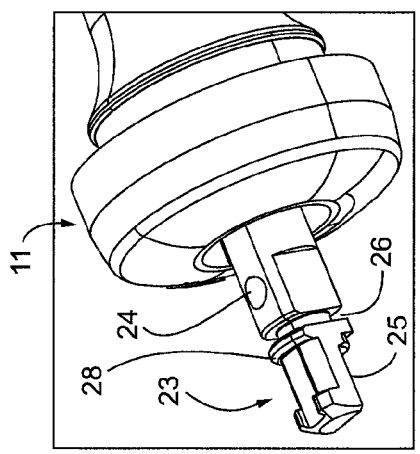
Figure 12:
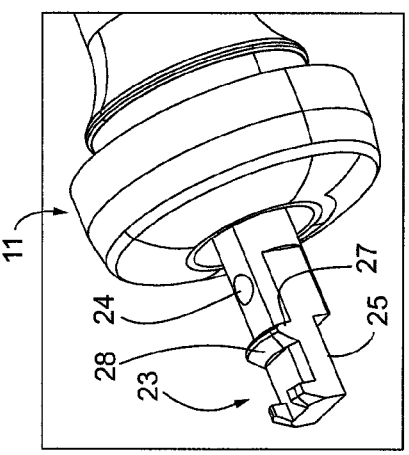
Figure 15:
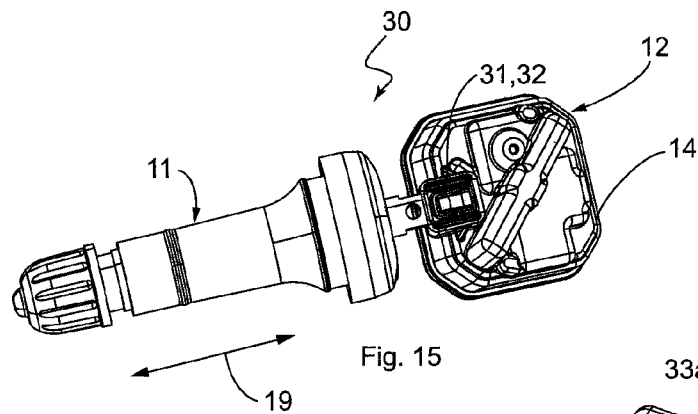
Figure 16:
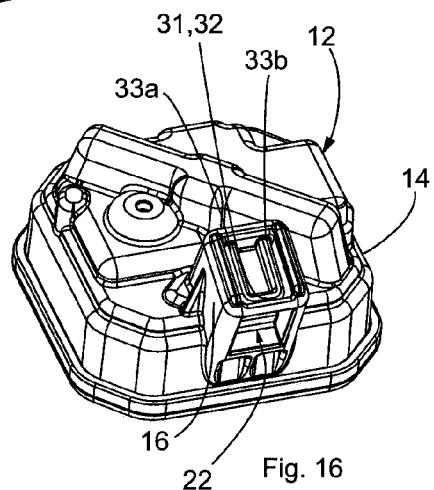
Figure 17:
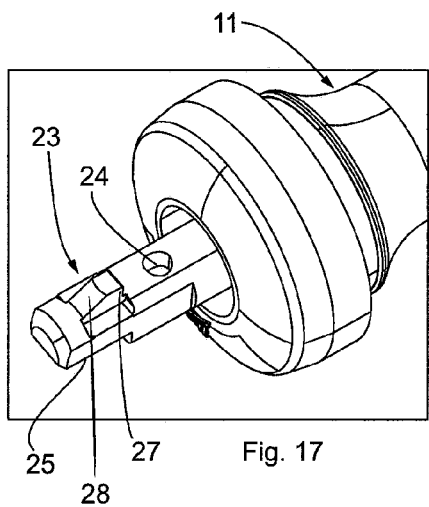
Figure 18:
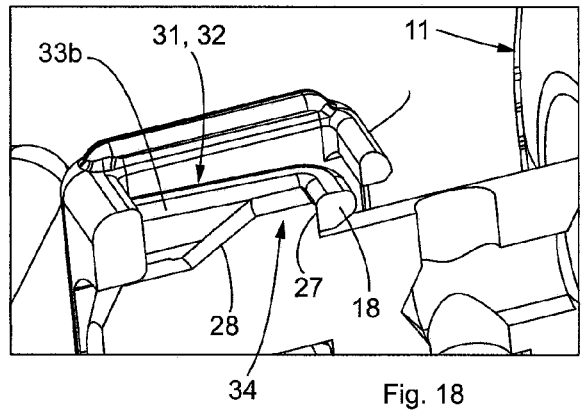
Figure 19:
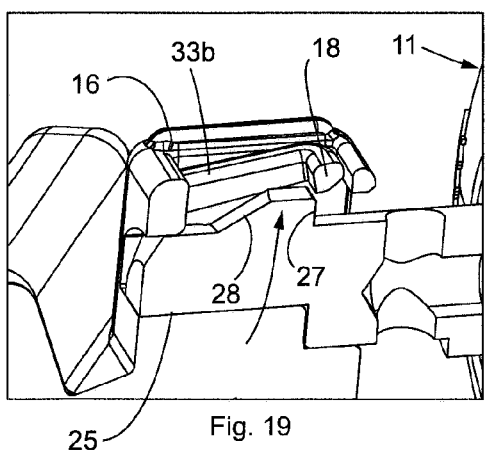
Figure 20:
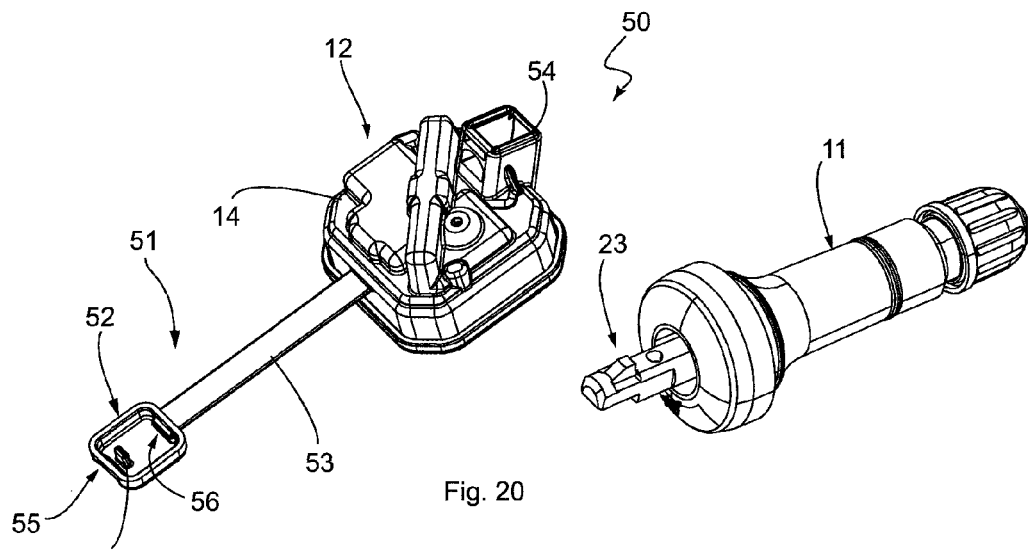

FIGS. 9 and 12 show two different embodiments of the valve body 11, wherein the embodiments differ because of the design of the particular mounting portion 23. In FIG. 9, the mounting portion 23 of the valve body has a recess 26 which, in this concrete embodiment, is designed to surround the entire circumference of the valve body 11. It is also possible to design the recess 26 in such a way that it surrounds the valve body only in sections. At the same time, it has to be ensured that the snap-in hook 18 of the mounting element 17 is able to engage in the recess 26 in order to attach the valve body 11 to the tire pressure sensor 12. FIG. 10 shows how the snap-in hook 18 engages in the recess 26 so that the valve body 11 can no longer be pulled out of the receptacle 22 of the housing. According to the embodiment in FIG. 12, an adapter in the form of a flange 27 has been provided as an alternative to the recess 26, which adapter is integrally molded on the side of the mounting portion 23 facing away from the bevel 25. When mounting the valve body 11 to the tire pressure sensor 12, the snap-in hook 18 of the mounting element 17 engages behind the flange 27 so that the valve body 11 can no longer be pulled out of the receptacle 22 of the mounting area 16, as shown in FIG. 13. According to FIGS. 10 and 13, the snap-in hook 18 is engaged with the recess 26 or the flange 27, which results in the fact that the mounting portion 23 of the valve body 11 is also detachably engaged by means of a mounting element 17 with the mounting area 16 of the housing 14. Both embodiments of the valve body 11 have the common feature that each of them has a ramp-like oblique surface 28, which is integrally molded on the circumferential surface of the valve body. In the first embodiment of the valve body 11 according to FIG. 9, said oblique surface is designed in such a way that it adjoins the recess 26. In the second embodiment of the valve body 11 according to FIG. 12, said oblique surface is designed as part of the flange 27. The oblique surface 28 serves the purpose that the snap-in hook 18, which is flexibly mounted to the mounting area 16, can be moved over the ramp-like oblique surface without having to use a tool, when mounting the valve body 11 to the tire pressure sensor 12. As soon as the resiliently swiveled snap-in hook 18 has passed the oblique surface 28, it is engaged in the recess 26 (see FIG. 10) or it is engaged behind the flange 27 (see FIG. 13) in order to engage the mounting portion 23 of the valve body 11 with the mounting element 17 of the housing 14. In each case, because of its flexible properties, the mounting element 17 returns to its starting position after passing the oblique surface 28. As a result, the mounting element 17 becomes engaged with the mounting portion 23 of the valve body 11. FIGS. 10 and 13 show a locking position for the snap-in hook 18, whereas FIGS. 11 and 14 show, respectively, a release position for the snap-in hook 18. In the release position, the snap-in hook 18 is disengaged from the mounting portion 23 of the valve body 11, which is made possible by means of the two support arms 20a, 20b, which allow the snap-in hook 18 to be swiveled about the rotational axis 21 of both support arms 20a, 20b. As a result, each of the support arms 20a, 20b functions in the manner of a torsion bar or torsion spring, as described above. The swivel movement of the snap-in hook 18 is accompanied by a rotation of the support arms 20a, 20b about their rotational axis 21, by means of which the mounting element is disengaged from the mounting portion 23 of the valve body 11.

FIGS. 15 to 19 show a tire pressure control system 30 according to a second embodiment of the invention. This tire pressure control system 30 also comprises a valve body 11 and a tire pressure sensor 12 with a housing 14, which houses the means for determining tire-specific parameters. For the second embodiment, these means are not shown because they are known form prior art.

In the second embodiment, the valve body 11 and the tire pressure sensor 12 are also detachably connected, but this time by means of a different mounting element 31. Also in this case, the mounting element 31 is designed at the chimney-shaped mounting area 16 of the housing 14, as shown, for example, in FIG. 16. At the same time, the mounting element 31 has a bow-shaped design, or is designed in the form of a U-shaped clamp 32. The bar connecting the two legs of the U-shaped clamp 32 corresponds in its function to the snap-in hook 18, wherein both legs of the clamp 32 define two support arms 33a, 33b for the snap-in hook 18. Both support arms 33a, 33b, which extend parallel to the longitudinal direction 19 of the valve body 11, have a flexible design and are attached to the mounting area 16. More precisely, the longitudinal ends of the clamp 31 facing away from the snap-in hook 18 are mounted at the housing 14 and designed in the form of a spring arm. In the second embodiment, the mounting portion 23 of the valve body 11 has also an adapter 27, which in this embodiment is defined as mounting lug 33 (for example, see FIG. 18 or 19). Said mounting lug is integrally molded on the mounting portion 23 of the valve body 11. Alternatively, it is also possible that, instead of an adapter 27, a recess is formed on the mounting portion 23 of the valve body 23 into which the snap-in hook 18 of the second embodiment engages.

For the purpose of mounting the valve body 11 to the tire pressure sensor 12, the valve body 11 is appropriately aligned with its bevel 25 and inserted in the receptacle 22 of the mounting area 16. As a result, the U-shaped clamp 32 of the mounting element 31, which can be swiveled in a flexible manner and which is formed integrally with the housing 14, slides on the ramp-like oblique surface 28. Because of the flexible support arms 33a, 33b, said U-shaped clamp 32 is swiveled until the clamp passes the oblique surface 28 and engages behind the mounting lug 33, which corresponds to the locking position of the snap-in hook 18 shown in FIG. 18. This allows for a tool-free assembly, wherein the U-shaped clamp 32 is deflected in the manner of a spring clip and encompasses the mounting lug 33. Basically, the mounting lug 33 corresponds to the adapter 27 described above for the first embodiment. In the locking position shown in FIG. 18 in which the valve body 11 is detachably connected to the tire pressure sensor 12, the U-shaped clamp 32 overlaps the mounting lug 33 formed integrally to the mounting portion 23 of the valve body 11. As a result, the valve body 11, which is arranged in the receptacle 22, cannot be pulled out of the receptacle 22.

To be able to remove the valve body 11 from the tire pressure sensor 12, the U-shaped clamp 32 has to be swiveled so that it no longer blocks the movement path of the mounting lug 33. In other words, the U-shaped clamp 32 has to be moved into the release position shown in FIG. 19 in which the snap-in hook 18 has been disengaged from the mounting portion 23 of the valve body 11. As a result, the valve body 11 can be pulled in longitudinal direction 19 out of the receptacle 22. Different from the first embodiment, the snap-in hook 18 or the mounting element 31 or the U-shaped clamp 32 is supported at its longitudinal end facing away from the snap-in hook 18 at the housing 14. It is designed in the manner of a spring arm which, in a swivel movement pointing away from the longitudinal direction 19 of the valve body 11, disengages the snap-in hook 18 from the valve body 11 or the mounting lug 33 of the valve body 11.

A third embodiment of a tire pressure control system 50 according to the present invention is shown in FIGS. 20 to 24. Again, the tire pressure control system 50 comprises the valve body 11 and the tire pressure sensor 12. The valve body 11 shall be attached to the tire pressure sensor 12 by means of a mounting element 51, which is formed integrally with the housing 14 of the tire pressure sensor 12. In the third embodiment of the tire pressure control system 50, the mounting element 51 has a cover-shaped clamp cap 52, which is connected with the housing 14 via a hinge-like strap. The hinge-like strap represents a film hinge 53, which is formed integrally with the clamp cap 52 and the housing 14. By means of the film hinge 53, the clamp cap 52 can be moved in relation to the actual housing 14, although the clamp cap 52 of the mounting element 51 is formed integrally with the housing 14.

Figure 21:
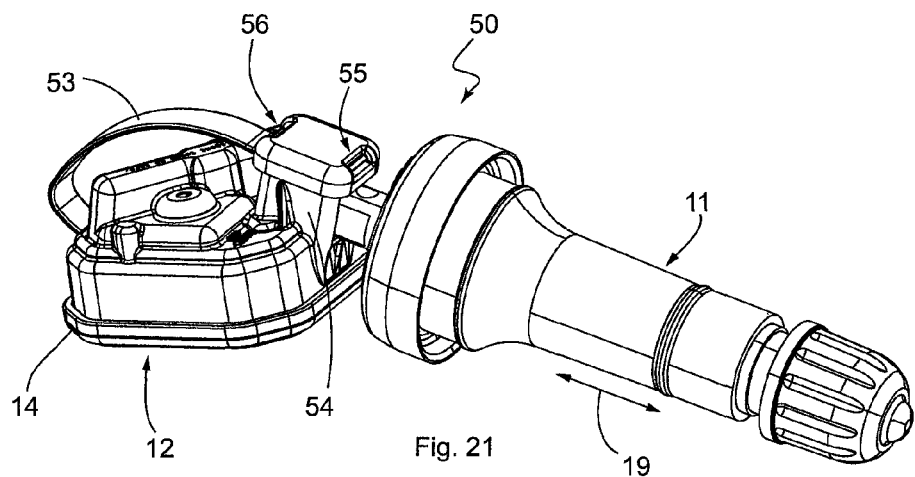
Figure 22:
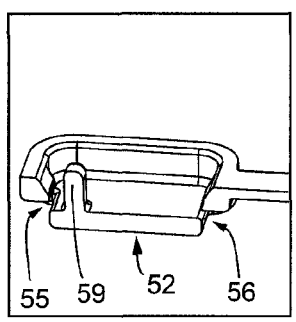

The housing 14 has a box-shaped mounting area 54 designed in a chimney-like manner (for example, see FIG. 20), on which the clamp cap 52 of the mounting element 51 can be pressed, resulting in the fact that the clamp cap 52 is jammed with the mounting area 54 and thus detachably connected with the mounting area 54, as shown in FIG. 21.

Figure 23:
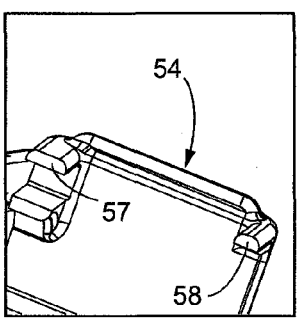

In the clamp cap 52, two clamp recesses 55, 56 have been arranged one after the other in longitudinal direction 19 of the valve body 11, which extend transverse to the longitudinal direction 19. The clamp recesses 55, 56 are clearly shown in a perspective lateral view in FIG. 22. These clamp recesses 55, 56 interact with clamping bars 57, 58, which are respectively designed in the mounting area 54, as shown in FIG. 23. For assembly, the clamp cap 52 is pressed on the mounting area 54. As a result, the clamping bars 57, 58 of the mounting area 54 are pushed into the clamp recesses 55, 56 of the clamp cap 52, which is possible because of the flexible material of the housing 14 (and thus the clamp cap 52 and the mounting area 54).

Figure 24:
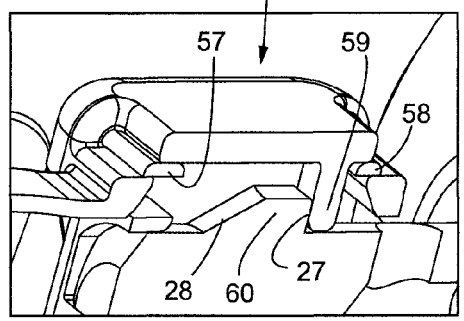

Pressing the clamp cap 52 on the mounting area 54 can take place after the mounting portion 23 of the valve body 11 is inserted into the receptacle 22 of the housing 14. During the pressing process, a clamping lug 59 which, when the valve body 11 is inserted in the receptacle 22, extends from the clamp cap 52 transverse to the longitudinal direction 19 of the valve body, engages behind a projection 60, which is integrally molded to the mounting portion 23 of the valve body 11, in such a way that it blocks a movement of the valve body 11 in its longitudinal direction 19 away from the housing 14. This locking position is shown in FIG. 24.

However, it is also possible that the clamp cap 52 is pressed on the mounting area 54 before the mounting portion 23 of the valve body 11 is inserted in the receptacle 22 of the housing 14. Then, the clamping lug 59 is situated in the movement path of the valve body 11, when the valve body 11 is inserted in the receptacle 22 of the housing 14. Because of the flexible design of the clamping lug 59, the inserted mounting portion 23 of the valve body 11 pushes the clamping lug out of the movement path, which is supported by the ramp-like oblique surface 28 formed on the mounting portion 23 of the valve body and passing into the projection 60, which can be compared to the adapter 27. When the oblique surface 59 has passed the clamping lug 59, the clamping lug 59 returns to its original shape and engages behind the projection 60 in such a way that a movement of the mounting portion out of the receptacle 22 is blocked. As a result, the clamp cap 52 is engaged with the mounting portion 23 of the valve body 11.

In other words, the box-shaped mounting area 54 of the housing 14 comprises the clamping bars 57, 58 which, when the valve body 11 is mounted, extend transverse to its longitudinal direction 19. At the same time, the clamp recesses 55, 56, which are designed in complimentary fashion to the clamping bars 57, 58, are designed in the clamp cap 52. Via a clamp connection, which is formed after mounting the clamp cap 52 at the mounting area 54 in that the clamping bars 57, 58 are jammed in the clamp recesses 55, 56, the clamp cap 52 is attached to the housing 14 and blocks or locks a movement of the mounting portion 23 of the valve body 11.

To remove the valve body 11 form the tire pressure sensor 12, it is only required to take off the clamp cap 52 from the mounting area 54 of the housing 14. As a result, the clamping lug 59 is moved out of the movement path of the valve body 11 so that it can be pulled out of the receptacle 22 without any resistance or blockade.

Equal reference numerals used in the three embodiments respectively refer to identical or the same elements or components so that the description of elements or components of one embodiment applies equally to the remaining embodiments.

The invention described above is certainly not limited to the embodiments described and shown. It is obvious that an expert is able to make numerous changes on the embodiments shown in the drawing in line with the intended purpose, without leaving the scope of the invention. The invention involves everything included in the description and/or shown in the drawing, including ideas that differ from the concrete embodiments but are obvious to the expert.

The invention claimed is:

1. A tire pressure control system for a vehicle for determining tire-specific parameters, which comprises a valve body, at least one mounting element and a tire pressure sensor with a housing, which houses a sensor for determining at least one tire-specific parameter and for wireless transmission of the at least one tire-specific parameter to an on-board control device,
wherein the housing has a mounting area and the valve body comprises a mounting portion, and
wherein a mounting element detachably engages the mounting portion of the valve body with the mounting area of the housing,
wherein the mounting element is formed integrally with the housing of the tire pressure sensor.

2. A tire pressure control system according to claim 1, wherein the mounting portion of the valve body includes an oblique surface, which is integrally molded on the circumferential surface of the valve body and over which the flexibly mounted mounting element can be moved when mounting the valve body to the tire pressure sensor in order to engage the mounting portion of the valve body with the mounting element of the housing.

3. A tire pressure control system according to claim 1, wherein the mounting element has at least one snap-in hook which, when the valve body is mounted, extends in its longitudinal direction.

4. A tire pressure control system according to claim 3, wherein the at least one snap-in hook of the mounting element engages in a recess designed at the mounting portion of the valve body when the valve body has been attached to the tire pressure sensor.

5. A tire pressure control system according to claim 3, wherein the at least one snap-in hook of the mounting element engages in a flange integrally molded at the mounting portion of the valve body when the valve body has been attached to the tire pressure sensor.

6. A tire pressure control system according to claim 3, wherein the at least one snap-in hook is retained at the mounting area and is adapted to be moved in relation to the housing via at least one resiliently malleable support arm.

7. A tire pressure control system according to claim 6, wherein the at least one support arm extends transverse to the longitudinal direction of the mounted valve body, wherein the at least one support arm is designed in the form of a torsion bar, via which the at least one snap-in hook is adapted to be disengaged from the mounting portion of the valve body by being swiveled about the rotational axis of the at least one support arm.

8. A tire pressure control system according to claim 6, wherein the at least one support arm extends parallel to the longitudinal direction of the mounted valve body, wherein the at least one support arm is supported at its longitudinal end facing away from the snap-in hook at the housing and is designed in the manner of a spring arm which, in a swivel movement pointing away from the longitudinal direction of the valve body, disengages the at least one snap-in hook from the valve body.

9. A tire pressure control system according to claim 8, wherein the at least one snap-in hook is designed in the form of a U-shaped clamp that is adapted to be swiveled in a flexible manner which, when the valve body has been mounted to the tire pressure sensor, is overlapping a mounting lug, which is integrally molded to the mounting portion of the valve body.

10. A tire pressure control system according to claim 2, wherein the mounting element has a cover-shaped clamp cap, which is connected with the housing via a film hinge, wherein the mounting area of the housing is designed in the form of a box and, after the valve body has been mounted to the tire pressure sensor, the clamp cap is releasably attached at the box-shaped mounting area and engaged with the mounting portion of the valve body.

11. A tire pressure control system according to claim 10, wherein the box-shaped mounting area of the housing has at least one clamping bar, which extends in longitudinal direction transverse to the mounted valve body, and at least one clamping recess is designed in the clamp cap in complementary fashion to the at least one clamping bar, wherein via a clamp connection which, after mounting the clamp cap to the mounting area, is formed at the mounting area by the clamping bar clamped in the at least one clamping recess, the clamp cap is attached to the housing in such a way that the mounting portion of the valve body is locked.

12. A tire pressure control system according to claim 10, wherein a clamping lug which, when the valve body has been mounted, extends from the clamp cap transverse to the longitudinal direction of the valve body, engages behind a projection, which is integrally molded to the mounting portion of the valve body, in such a way that it blocks a movement of the valve body in its longitudinal direction away from the housing.

13. A tire pressure control system according to claim 1, wherein the mounting portion of the valve body has a bevel at least in sections, and the mounting area of the housing has a receptacle designed in complementary fashion to the bevel so that, when mounting the valve body to the tire pressure sensor, the mounting portion of the valve body is inserted in a torsion-proof manner in the receptacle.

14. A tire pressure control system according to claim 2, wherein the mounting element has at least one snap-in hook which, when the valve body is mounted, extends in its longitudinal direction.

15. A tire pressure control system according to claim 4, wherein the at least one snap-in hook is retained at the mounting area and is adapted to be moved in relation to the housing via at least one resiliently malleable support arm.

16. A tire pressure control system according to claim 5, wherein the at least one snap-in hook is retained at the mounting area and is adapted to be moved in relation to the housing via at least one resiliently malleable support arm.

17. A tire pressure control system according to claim 11, wherein a clamping lug which, when the valve body has been mounted, extends from the clamp cap transverse to the longitudinal direction of the valve body, engages behind a projection, which is integrally molded to the mounting portion of the valve body, in such a way that it blocks a movement of the valve body in its longitudinal direction away from the housing.

\* \* \* \* \*